United States Patent [19]

Del Monte et al.

[11] Patent Number: 5,547,148
[45] Date of Patent: Aug. 20, 1996

[54] CRASHWORTHY LANDING GEAR

[75] Inventors: Berardino Del Monte, Monroe; Ralph P. Barone, Hamden, both of Conn.

[73] Assignee: United Technologies Corporation, Hartford, Conn.

[21] Appl. No.: 341,786

[22] Filed: Nov. 18, 1994

[51] Int. Cl.⁶ .................................................. B64L 25/58
[52] U.S. Cl. ........................... 244/104 FP; 188/376; 244/104 R; 244/138 R; 244/100 R
[58] Field of Search .......................... 244/17.17, 100 R, 244/104 R, 104 FP, 138 R; 188/371, 376

[56] References Cited

U.S. PATENT DOCUMENTS

| | | | |
|---|---|---|---|
| 2,731,218 | 1/1956 | Bonar | 244/104 FP |
| 3,143,321 | 8/1964 | McGehee et al. | 188/376 |
| 3,236,333 | 2/1966 | Mitchell | 244/138 R |
| 3,997,133 | 12/1976 | Fagan | 244/100 R |

*Primary Examiner*—Andres Kashnikow
*Assistant Examiner*—Tien Dinh
*Attorney, Agent, or Firm*—Terrance J. Radke

[57] ABSTRACT

A shock strut assembly for an aircraft landing gear includes a trunnion fitting, a compressible oleo strut subassembly, a wheel subassembly, an energy dissipating subassembly, and a mechanical load control subassembly. The oleo strut subassembly includes a cylinder member having an upper end mounted in combination with the trunnion fitting by means of the mechanical load control subassembly and a piston member having a lower end affixed in combination with the wheel subassembly and an upper end slidably inserted in the cylinder member. The energy dissipating subassembly includes a cylindrical cutter member secured in combination with the cylinder member and the trunnion fitting and a frangible tube member mounted in concentric combination with the cylinder member so that the lip of the upper end thereof is disposed in abutting engagement with the cutter member. The mechanical load control subassembly includes a shear ring, a retainer nut, complementary flange cutouts formed in the endface of the cylinder member, and complementary torsion key slots formed in the trunnion fitting. The shear ring has a configuration that segregates the landing forces induced in the shock strut assembly during landings and includes a cylindrical body having opposed shear flanges extending outwardly therefore. Each shear flange includes a torsion key. The shear ring is mounted in locked combination with the cylinder member and the trunnion fitting by means of the threaded engagement of the retainer nut with the trunnion fitting wherein the retainer nut engages the shear flanges. In the locked configuration, the cylindrical body abuts the cylinder member, the shear flanges engage the complementary flange cutouts of the cylinder member and the torsion keys are disposed in the complementary torsion key slots. During normal landing, the shear ring prevents movement of the cylinder member with respect to the trunnion fitting. In a crash landing, the shear flanges shear at a predetermined axial load failure limit, which allows the cylinder member to be displaced relative to the trunnion fitting. Displacement of the cylinder member causes the frangible tube member to interact with the cutter member, causing fracturing of the frangible tube member for crash landing energy dissipation.

9 Claims, 4 Drawing Sheets

CRASHWORTHY LANDING GEAR

TECHNICAL FIELD

The present invention relates to aircraft landing gear, and more particularly, to a crashworthy aircraft landing that incorporates a mechanical load control and a frangible tube member for predictably controlling energy dissipation by means of the landing gear in the event of a crash landing.

BACKGROUND OF THE INVENTION

A significant percentage of the operating time of a helicopter involves low-speed, low-altitude flight regimes and/or hovering operations. Accidents occurring during these modes of helicopter operations involve high vertical descent rates with the helicopter in a near normal flight attitude. While there is some degree of uncertainty vis-a-vis the flight attitude at ground impact of helicopters involved in high-altitude and/or high speed accidents, to the extent that the helicopter pilot is able to exercise the autorotation technique, such helicopters will impact the ground in a near normal flight attitude. In these type of accidents, the landing gear system, whether of the skid-type or the wheel-type, is the first element of the helicopter to impact the ground. As such, landing gear systems are typically designed with the constraint that such systems must be capable of attenuating or dissipating a large degree of the impact energy experienced in a crash landing situation. For example, the FAA requirement for civil aircraft is that such aircraft must exhibit structural integrity after a free fall ground impact from a height of 8.0 inches (equivalent to a sink rate of 6.55 ft/sec). Military aircraft requirements are typically more stringent, requiring structural integrity after a free fall ground impact from a height of 26.8 inches (equivalent to a sink rate of 12 ft/sec). In addition, landing gear systems should be designed so that once the energy-absorbing capability of the landing gear system is exceeded, the landing gear system reaction to the crash landing does not increase the risk of danger to any occupants of the helicopter, e.g., controlled penetration the cockpit and/or cabin areas of the helicopter and/or avoiding rupturing the fuel cells of the helicopter.

The survivability constraint is typically accommodated by design of the landing gear system and/or the undercarriage of the helicopter so that a large percentage of the impact energy arising from a crash landing is attenuated or dissipated by the undercarriage and/or landing gear system. For example, some helicopters are designed with crushable tub structures, i.e., the portion of the fuselage below the passenger compartment, which are designed to crush during a crash landing to attenuate or dissipate the impact energy. This type of design is similar to that used in the automotive industry for attenuating or dissipating the impact energy generated in head-on crashes.

With a skid-type landing gear system, the skids are designed to attenuate the energy generated by normal landings by elastic deformation of the skids. The skids are operative to crush in response to the impact energy of a crash landing. The crushing of metal skids absorbs a significant percentage of the crash landing energy. While skid-type landing gear systems are generally effective, one drawback to such systems is that the degree of degradation of the skids over time due to normal landings may not be readily observable by visual inspection. In addition, replacement of the skids due to degradation arising from normal landings is a labor intensive and expensive process.

Wheel-type landing gear systems typically incorporate a compressible oleo strut subassembly that is operative to attenuate the energy generated by normal landings. Energy attenuation is achieved by stroking which causes compression of a compressible gas in the oleo strut subassembly. This type of energy attenuation is generally effective in decoupling landing loads from the helicopter, and in addition, does not result in any significant degradation of the landing gear system over time due to multiple normal landings. To react the impact energy of a crash landing, wheel-type landing gear systems may employ shear pins which are operative to transfer the impact energy of the crash landing from the oleo strut subassembly to the landing gear trunnion.

The shear pins are inserted in aligned apertures in the oleo strut subassembly and landing gear trunnion and are designed to fail at a predetermined load level (as a result of a crash landing) to effectuate the transfer of the impact energy of the crash landing from the oleo strut subassembly to the landing gear trunnion. There are several disadvantages arising from the use of shear pins. First, shear pins do not have a high degree of durability. Load transfer between the oleo strut subassembly and the landing gear trunnion is subject to a high stress gradient due to the geometry of the shear pins and the corresponding apertures. This can result in local yielding and degradation over time due to multiple normal landings. Secondly, the mechanical degradation of the shear pins and/or aligned apertures is not readily apparent during a visual inspection. In addition, the replacement of worn and/or damaged shear pins and/or the oleo strut subassembly and/or the trunnion (due to aperture wear and/or damage) is a labor intensive, time consuming, and expensive proposition. Finally, shears pins react all of the loads, i.e., vertical, drag, side, and torsional loads, arising from normal landings. It is difficult to analytically predict the degree of damage to the shear pins and corresponding apertures from all loading conditions, and as such, it is difficult to predict with a high degree of certainty at what axial crash load, i.e., ultimate shear loading, the shear pins will shear at. In addition, normal wear and/or degradation of the shear pins and/or corresponding apertures directly affects shear pin tolerances and interfits, which has a significant impact on the ultimate shear loading at which the shear pins fail.

A need exists to develop a durable, predictable, reliable, and maintainable mechanical means to control the functioning of a wheel-type landing gear system in response to a crash landing.

DISCLOSURE OF THE INVENTION

One object of the present invention is to provide a mechanical load control subassembly for a crashworthy landing gear shock strut assembly that segregates the landing forces exerted on the mechanical load control subassembly into vertical, drag, side, and torsion loads to minimize local yielding and degradation of the mechanical load control subassembly.

Another object of the present invention is to provide a mechanical load control subassembly for a crashworthy landing gear shock strut assembly that segregates the landing forces exerted on the mechanical load control subassembly into vertical, drag, side, and torsion loads such that the mechanical load control subassembly is reliable and predictable in failing at a predetermined axial load level.

A further object of the present invention is to provide a mechanical load control subassembly for a crashworthy landing gear shock strut assembly that is readily inspectable and replaceable.

One more object of the present invention is to provide an energy dissipating subassembly for a crashworthy landing gear shock assembly that dissipates crash landing energy by a mechanical fracturing mechanism.

These and other objects of the present invention are achieved by a shock strut assembly for a crashworthy aircraft landing gear that comprises a trunnion fitting mounted in combination with the aircraft, a wheel subassembly, a compressible oleo strut subassembly operative to attenuate energy coupled into the aircraft by the wheel subassembly during normal landings, the compressible oleo strut subassembly including a cylinder member having a lower end and an upper end mounted in combination with the trunnion fitting, a piston member having a lower end affixed in combination with the wheel subassembly and an upper end slidably inserted in the lower end of the cylinder member, and a floating piston mounted for sliding movement in the piston member, a mechanical load control subassembly locked in combination with the upper end of the cylinder member and the trunnion fitting, the mechanical load control subassembly being operative during normal landings to restrain relative movement between the cylinder member and the trunnion fitting and being operative during a crash landing in response to a predetermined axial load to allow upward displacement of the cylinder member with respect to the trunnion fitting, and an energy dissipating subassembly disposed in combination with the cylinder member and operative in response to the crash landing to mechanically dissipate crash landing energy induced in the aircraft by the wheel subassembly during the upward displacement of the cylinder member.

The described embodiment of the mechanical load control subassembly comprises a shear ring having a cylindrical body and opposed shear flanges extending outwardly from cylindrical body, each said shear flange having a torsion key, a retainer nut, the upper endface of the cylinder member having complementary flange cutouts, and the trunnion fitting having an upper internal shoulder having complementary torsion key slots. The shear ring is locked in combination with the upper end of the cylinder member and the trunnion fitting by threaded engagement of the retainer nut with the trunnion fitting wherein the retainer nut engages the shear flanges of the shear ring, and wherein in the locked combination the cylindrical body abuts the cylinder member, the shear flanges engage the complementary flange cutouts of the cylinder member, and the torsion keys are disposed in complementary torsion key slots. Each shear flange comprises an inner restraint segment and an outer shearable segment defined by a shear line such that in the locked combination the retainer nut engages the outer shearable segments of the opposed shear flanges and the inner restraint segments of the opposed shear flanges engage the complementary flange cutouts of the trunnion fitting. The opposed shear flanges have a predetermined thickness such that, in response to the predetermined axial load from the crash landing, the opposed flanges are sheared along the shear lines thereof wherein the upward displacement of the cylinder member with respect to the trunnion fitting can occur.

The described embodiment of the energy dissipating subassembly comprises a cylindrical cutter member secured in combination with the cylinder member and the trunnion fitting, and a frangible tube member mounted in concentric combination with the cylinder member. The frangible tube has a lower end secured in combination with the lower end of the cylinder member and an upper end disposed in abutting engagement with the cylindrical cutter member wherein the upward displacement of the cylinder member during the crash landing causes the frangible tube member to interact with the cylindrical cutter member such that the frangible tube member is fractured during the upward displacement of the cylinder member with respect to the trunnion member. The cylindrical cutter member includes an arcuate fracture surface, and the upper end of said frangible member is disposed in abutting engagement with the arcuate fracture surface.

BRIEF DESCRIPTION OF THE DRAWINGS

A more complete understanding of the present invention and the attendant features and advantages thereof may be had by reference to the following detailed description of the invention when considered in conjunction with accompanying drawings wherein.

BEST MODE FOR CARRYING OUT THE INVENTION

Figure 1A:
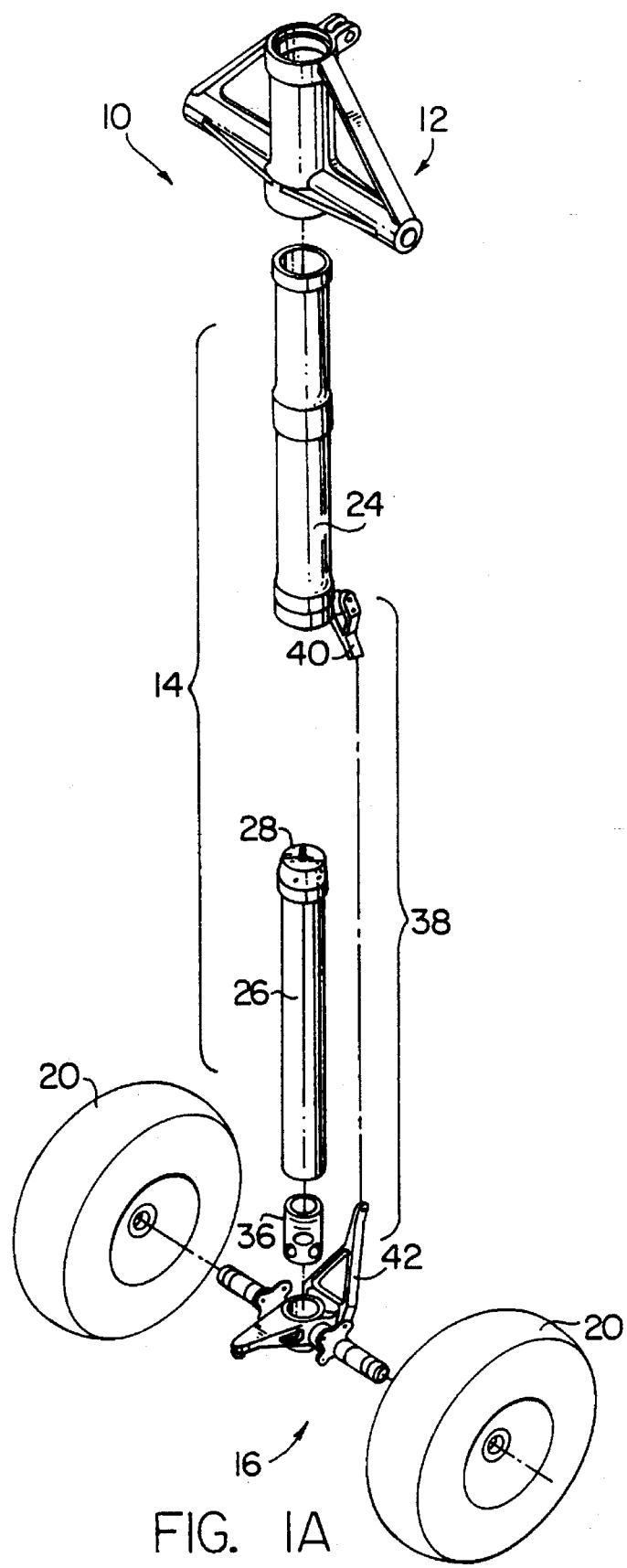
FIG. 1A is an exploded perspective view of a shock strut assembly according to the present invention for a crashworthy helicopter landing gear system
Figure 1B:
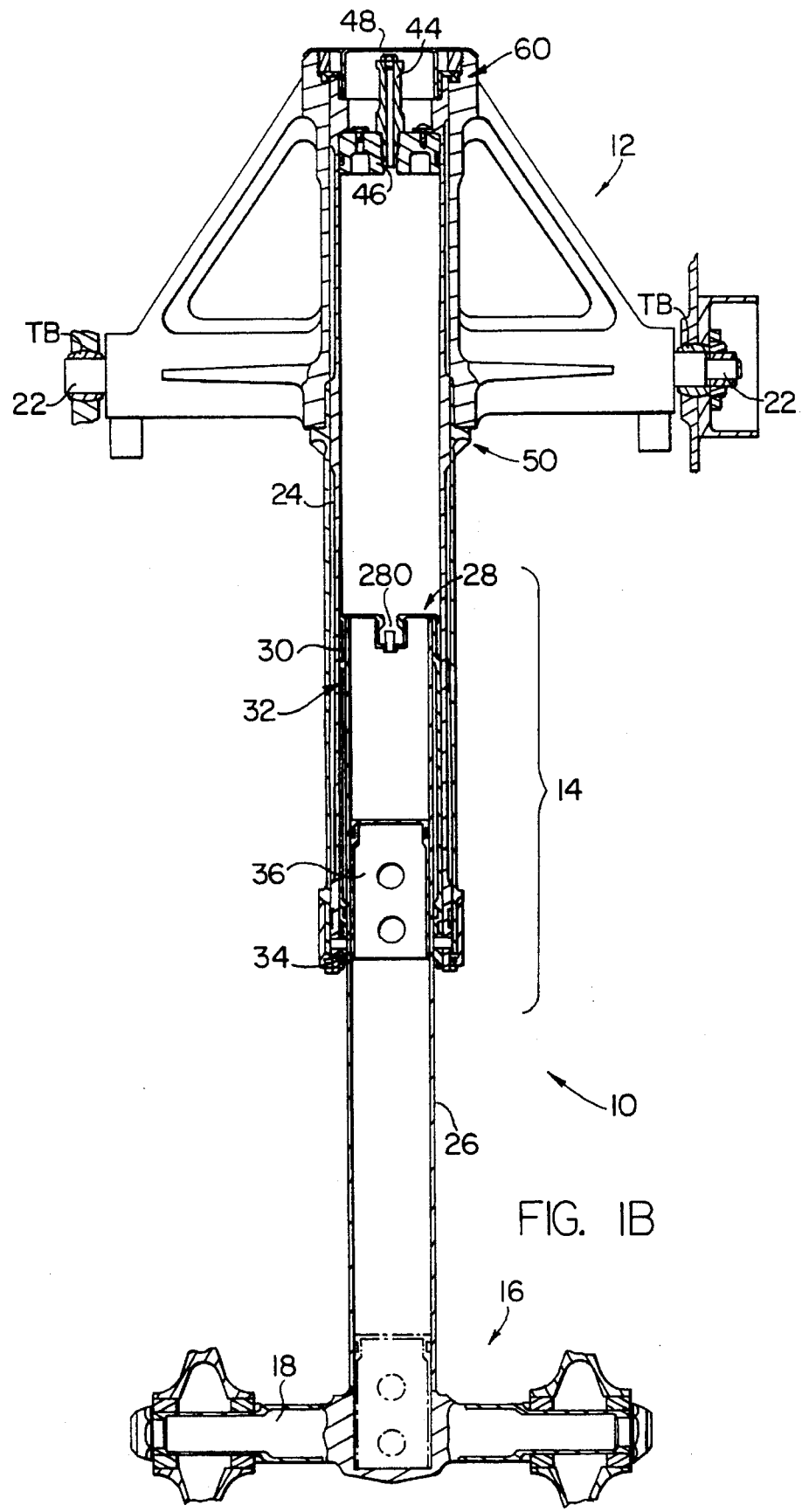
FIG. 1B is a cross-sectional view of the shock strut assembly according to the present invention.
Figure 1C:
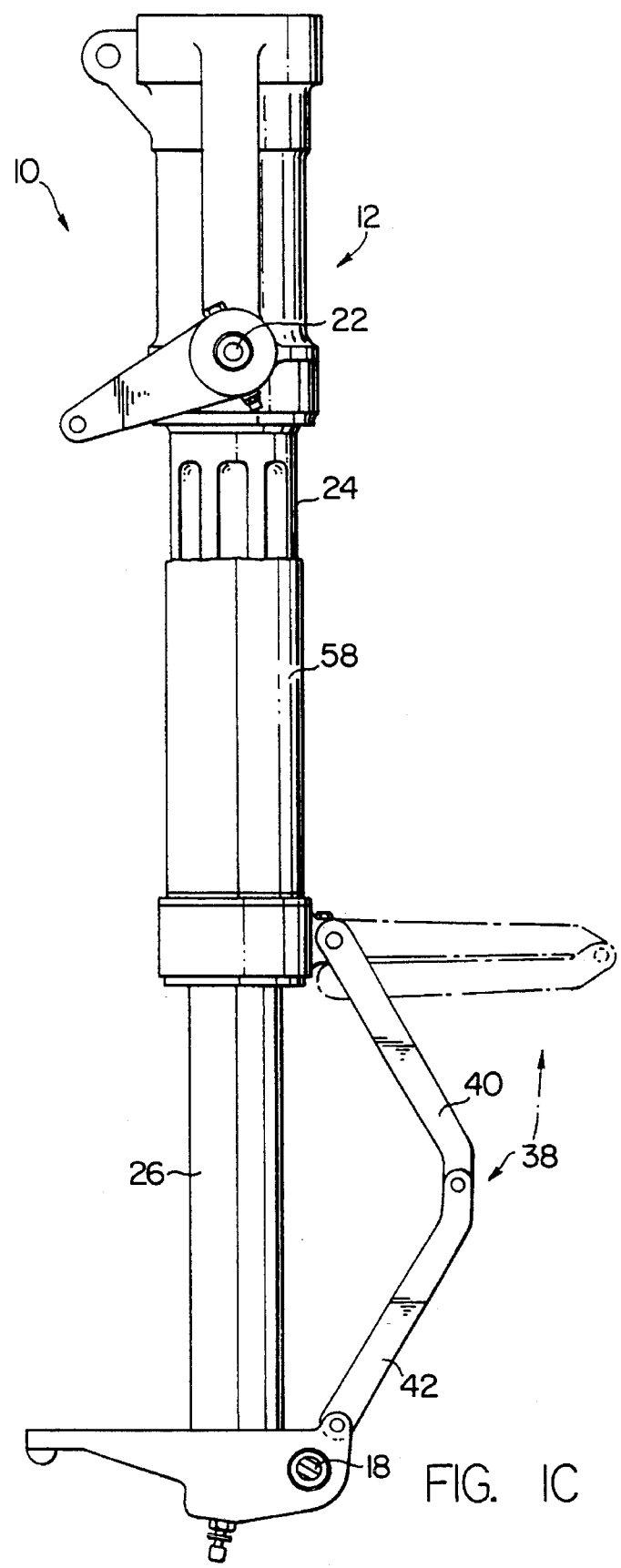
FIG. 1C is a plan view of the shock strut assembly of FIG. 1B.

Referring now to the drawings wherein like reference characters identify corresponding or similar elements throughout the several views, FIGS. 1A, 1B, 1C depict a shock strut assembly 10 for a crashworthy wheeled landing gear system for a helicopter. The shock strut assembly 10 according to the present invention includes means for mechanically dissipating energy generated during a crash landing and mechanical means for predictably controlling the operation of the energy dissipating means during a crash landing. The mechanical control means is readily integrated in combination with the shock strut assembly 10, is durable, easily replaceable, and highly predictable in failing at a predetermined load level during a crash landing.

The described embodiment of the shock strut assembly 10 comprises a trunnion fitting 12, a compressible oleo strut subassembly 14, a wheel subassembly 16 that includes an axle 18 and wheels 20, an energy dissipating subassembly 50, and a mechanical load control subassembly 60. The trunnion fitting 12 includes pins 22 for mounting the shock strut assembly 10 in rotatable combination with the helicopter fuselage (by means of trunnion bearings TB as indicated in FIG. 1B) such that the shock strut assembly 10 is alternately retractable for extended flight operations and extendible for near ground flight operations, e.g., aerial taxing, low level hovering, and/or landing.

The oleo strut subassembly 14 includes a cylinder member 24 having an upper end mounted in combination with the trunnion fitting 12 by means of the mechanical load control subassembly 60 as described hereinbelow in further detail and a piston member 26 sized for sliding movement within the cylinder member 24. The lower end of the piston member 26 is secured in combination with the axle 18 (for the described embodiment, the piston member 26 is integrally fabricated in combination with the axle 18; alternatively, the piston member 26 and the axle 18 can be fabricated as separate elements and secured in combination by a conventional technique such as welding or bolts) and the upper end of the piston member 26 is inserted within the cylinder member 24 as illustrated in FIG. 1B for sliding displacement with respect thereto.

The inserted end of the piston member 26 includes a centering cam 28 having an orifice 28O, a split ring "karon-type" bearing 30 (karon-type is used herein in the sense of exhibiting a low coefficient of friction similar to Teflon and having the additional characteristic of being suitable for post-fabrication machining to final form), and a rebound valve 32. A bearing—centering cam 34 is provided on the inner surface of the lower end of the cylinder member 24. A floating piston 36 is slidably mounted within the piston member 26 and functions as a separator between the oil and compressible gas volumes of the oleo strut subassembly 14. The volume within the piston member 26 between the floating piston 36 and the axle 18 is filled with a compressible gas. For the described embodiment, the compressible gas is nitrogen. A torque subassembly 38 comprising first and second torque arms 40, 42 is rotatably coupled between the axle 18 and the cylinder member 24 as illustrated in FIG. 1C (see also FIG. 1A). The centering cam 28, the split ring bearing 30, the rebound valve 32, the bearing-centering cam 34, and the torque subassembly 38 control the sliding interaction of the piston member 26 with respect to the cylinder member 24 during normal and crash landings.

Figure 4:
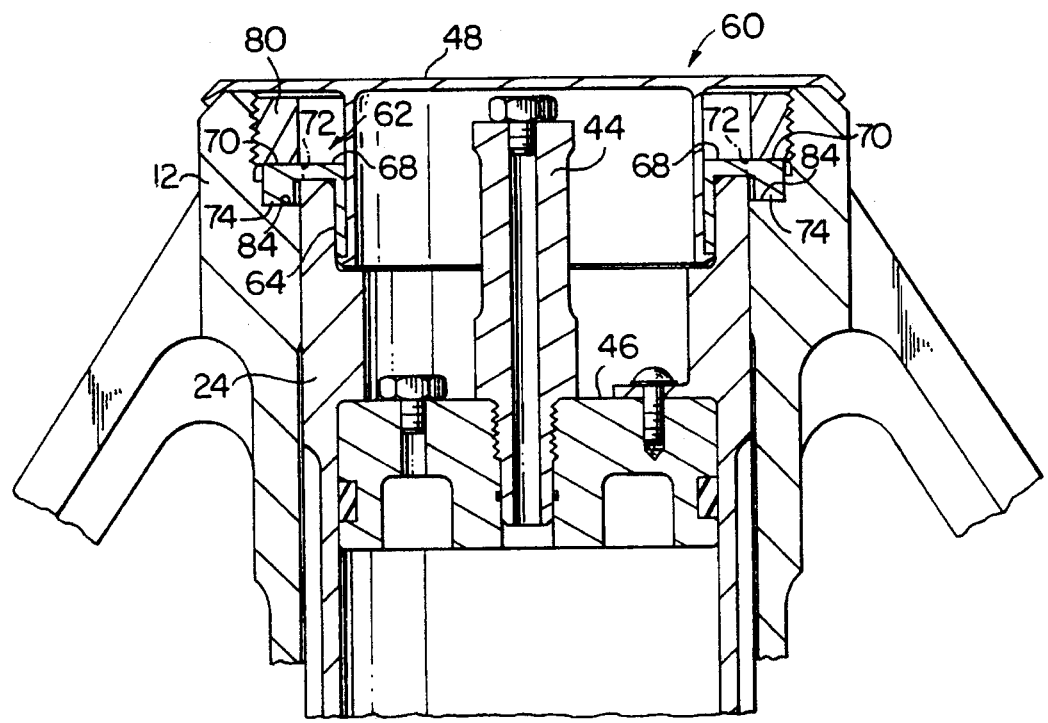
FIG. 4 is a cross-sectional view of the mechanical load control subassembly of FIG. 3 as mounted in the shock strut assembly according to the present invention.

A fill port 44 is mounted in combination with the upper end of the cylinder member 24 by means of a cylinder cap 46 as illustrated in FIG. 1B (see also FIG. 4). The volume within the cylinder member 24 and within the piston member 26 between the floating piston 36 and the centering cam 28 is filled with oil, e.g., an oil as defined by Mil-H-5606, utilizing the fill port 44. For the described embodiment of the oleo strut subassembly 14, approximately 236 in³ (7.2 lbs) of oil is required to fill such volume.

During normal landings, the landing gear is extended by rotating the trunnion fitting 12 about the trunnion bearings TB. With the shock strut assembly 10 in the extended position, the floating piston 36 assumes an equilibrium position as a result of opposing pressure forces exerted thereon by the oil and the compressible gas in the oleo strut subassembly 14. Landing loads are coupled through the wheels 20 and the axle 18 to cause the piston member 26 to be displaced upwardly into the cylinder member 24, i.e., the oleo strut subassembly 14 is compressed. Since the oil in the oleo strut subassembly 14 is essentially an incompressible liquid, the upward displacement of the piston member 26 decreases the overall internal volume of the cylinder member 24, forcing oil in the cylinder member 24 to be displaced through the orifice 28O into upper portion of the piston member 26. The displaced oil exerts a biasing force against the floating piston 36 to cause displacement thereof from the equilibrium position towards the axle 18. Such displacement of the floating piston 36 causes compression of the compressible gas in the lower portion of the piston member 26. The compression of the compressible gas in the oleo strut assembly 14 attenuates the landing loads induced in the landing gear, thereby effectively decoupling the landing loads from the helicopter. Concomitantly, the displacement of the piston member 26 causes volume changes in the zone between the inner surface of the cylinder member 24 and the outer surface of the piston member 26. The rebound valve 32 controls the transfer of oil into and out of this zone to provide a damping action vis-a-vis oil displacement occurring in the oleo strut subassembly 14 as a result of the landing loads. The mechanical loss control subassembly 60 is operative to maintain the cylinder member 24 in static relation to the trunnion fitting 12 during normal landings, i.e., no displacement of the cylinder member 24 relative to the trunnion fitting 12 during normal landings.

Figure 2:
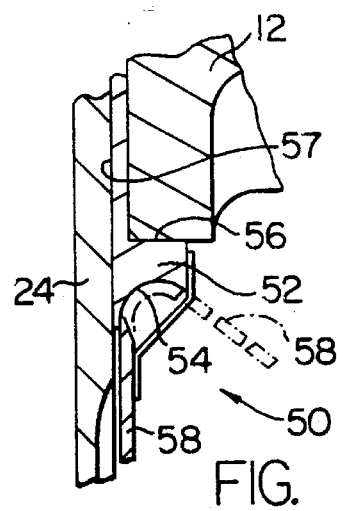
FIG. 2 is a partial cross-sectional view of a cylindrical cutter member of the energy dissipating subassembly of the present invention.

The energy dissipating subassembly 50, which functions as the means for mechanically dissipating energy generated during a crash landing, comprises a cylindrical cutter member 52 having an arcuate fracture surface 54, a restraining shoulder 56, and an interactive surface 57 as illustrated in FIG. 2 (see also FIG. 1B) and a frangible tube member 58. The cylindrical cutter member 52 is mounted to the bottom of the trunnion fitting 12 (see FIG. 1B, 2) with the restraining shoulder 56 in abutting engagement therewith such that a clearance gap 59 is defined by the cylindrical cutter member 52, i.e., between the surface of the cylinder member 24 and the frangible tube member 58. Preferably, the interactive surface 57 is coated or lined with a "karon-type" material which allows the clearance gap 59 to be defined to a tight tolerance. The interactive surface 57 acts as a bearing surface and a centering member during operation of the shock strut assembly 10 during a crash landing.

The frangible tube member 58 is disposed in concentric combination with the cylinder member 24 as illustrated in FIG. 1C (see also FIG. 1B). The lower end of the frangible tube member 58 is secured in combination with the lower end of the cylinder member 24 and the upper lip of the frangible tube member 58 is disposed in abutting engagement with the arcuate fracture surface 54 of the cylindrical cutter member 52. The upper end of the frangible tube member 58 may be machined, e.g., beveled or chamfered, to facilitate the initial fracturing thereof due to interaction with the cylindrical cutter member 52 during a crash landing as described in further detail hereinbelow. The frangible tube member 58 is fabricated from a material having moderate ductility and high fracture toughness since mechanical fracturing of such a material in a crash landing results in the dissipation of a large amount of energy (see example hereinbelow). For the described embodiment of the shock strut assembly 10, the frangible tube member 58 is fabricated from 2024 aluminum and has a thickness of about 0.125 inches.

Figure 3:
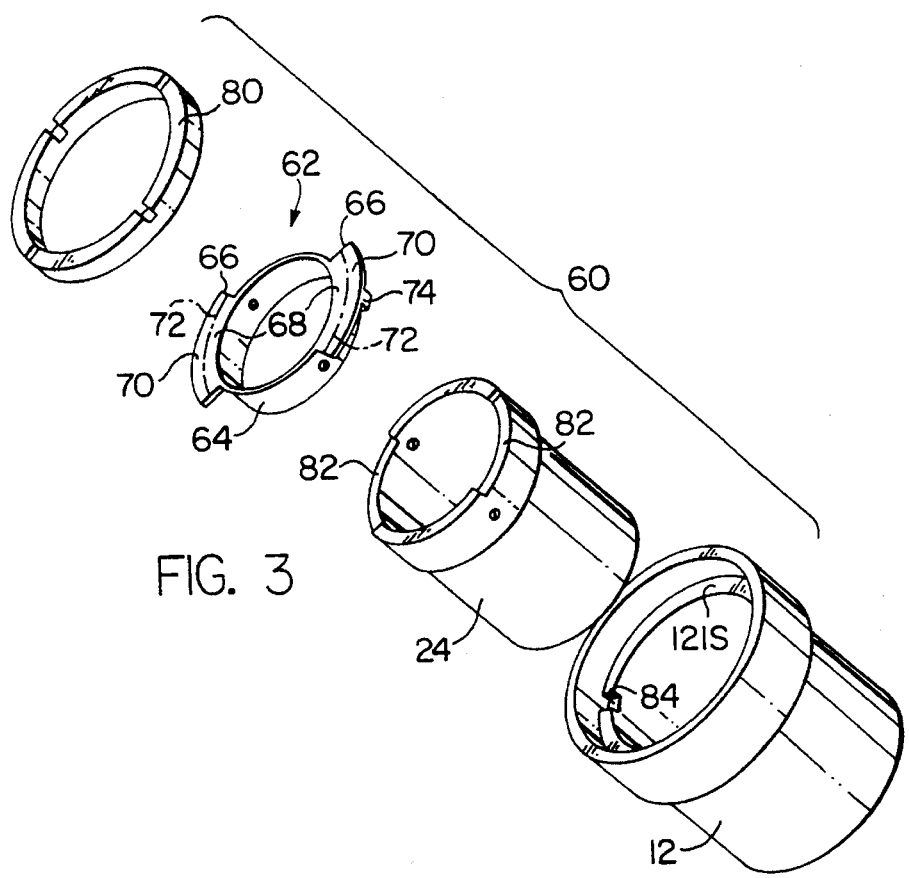
FIG. 3 is an exploded perspective view of a mechanical load control subassembly according to the present invention.

The mechanical load control subassembly 60 of the described embodiment is exemplarily illustrated in FIGS. 3–4 and includes a shear ring 62, a retainer nut 80, complementary flange cut-outs 82 formed in the endface of the cylinder member 24, and complementary torsion key slots 84 (only one slot is visible in FIG. 3) formed in an internal shoulder 12IS of the trunnion fitting 12. The shear ring 62 comprises a cylindrical body 64 having opposed shear flanges 66 depending outwardly from the upper end thereof. Each shear flange 66 includes an inner restraint segment 68 and an outer shearable segment 70 as defined by a shear line 72. Each outer shearable segment 70 includes a torsion key 74 depending downwardly therefrom.

With the cylinder member 24 of the oleo strut subassembly 14 inserted within the trunnion fitting 12, the shear ring 62 is mounted in combination with the cylinder member 24 and the trunnion fitting 12 as illustrated in FIG. 4 and secured in combination therewith by means of the threaded engagement of the retainer nut 80 in combination with the trunnion fitting 12. The outer surface of the cylindrical body 64 of the mounted shear ring 62 abuttingly engages the inner surface of the upper end of the cylindrical member 24, the inner restraint segments 68 of the shear flanges 66 abuttingly engage the complementary flange cutouts 82 of the cylindrical member 24, and the torsion keys 74 are engaged in the complementary torsion key slots 84 of the trunnion fitting 12. The lower endface of the engaged retainer nut 80 abuttingly engages the outer shearable segments 70 of the shear flanges 66 of the mounted shear ring 62. A cover 48, for the described embodiment the cover 48 is fabricated from 7075-T73 aluminum, is affixed to the upper end of the trunnion fitting 12 primarily to provide environmental protection for the trunnion fitting 12.

The inherent simplicity of the mechanical load control subassembly 60 according to the present invention enhances the maintainability of the shock strut assembly 10. The mechanical condition of the shear ring 62 may be readily inspected for wear and/or cracking by removing the trunnion cover 48, disengaging the retainer nut 80, and removing and visually inspecting the shear ring 62. A degraded shear ring 62 is readily replaceable utilizing the foregoing procedure.

As noted hereinabove, the shear ring 62 is operative to prevent upward displacement of the cylinder member 24 with respect to the trunnion fitting 12 during normal landings. This function of the shear ring 62 is achieved by the abutting engagement of the inner restraint segments 68 of the shear flanges 66 with the complementary flange cutouts 82 of the cylinder member 24.

The configuration of the mechanical load control subassembly 60, and in particular the shear ring 62, provides for the segregation of the landing loads induced in the landing gear during normal landings. During a normal landing, the landing gear is subjected to axial, torsional, drag, and side loads (collectively the landing loads). These landing loads are transmitted from the wheel subassembly 16 through the oleo strut subassembly 14 to the trunnion fitting 12 by means of the mechanical load control subassembly 60. More specifically, the axial landing loads are transmitted as a shear load acting on the shear flanges 66 and the retainer nut 80, the drag and side landing loads are transmitted as bearing loads acting on the abutting surfaces of the cylindrical body 64, the cylinder member 24, and the trunnion fitting 12, and the torsion landing loads are transmitted as torsion loads acting on the torsion keys 74 and the complementary torsion key slots 84.

The segregation of the landing loads facilitates the sizing of the shear ring 62 to react the drag, torsion, and side landing loads with a margin of safety that precludes premature failure of the shear ring 62 due to these landing loads. While some torsion stress is transmitted through the shear flanges 66, such torsion stress levels are significantly below the endurance limit of the shear flanges 66. Pragmatically, therefore, only axial landing loads are reacted by the shear flanges 66 (as shear stress). These characteristics of the mechanical load control subassembly 60, and in particular, the shear ring 62, means that local yielding and degradation thereof due to normal landing loads are minimized, thereby providing enhanced durability.

Since the shear ring 62 is subjected primarily to axial landing loads, and in light of the mounted configuration of the shear ring 62 with respect to the cylindrical member 24 and the retainer nut 80, the shear ring 62 fails in shear along the shear lines 72 of the shear flanges 66 when subjected to crash landing loading. These characteristics of the mechanical load control subassembly 60 makes design of the shear flanges 66 to fail at a predetermined axial load limit that is representative of a crash landing condition extremely practical. Calculating the ultimate shear load capability for a flat plate configuration fabricated from a specific material can be accomplished by one skilled in the art using known techniques. For the shear ring 62 described herein, the shear ring 62 is fabricated from 6061-T6 aluminum using conventional techniques, and the shear flanges 66 have a thickness of about 0.19 inches based upon the predetermined axial load failure limit described hereinbelow. The relative simplicity of the configuration of the shear flanges 66 allows the thickness dimension thereof to be held within a tolerance of ±0.001 inches (about 1.3%).

In a crash landing, the piston member 26 is displaced upwardly into the cylinder member 24. The axial crash landing loads acting on the oleo strut subassembly 14 are transmitted through the oil therein to the cylinder cap 46, from the cylinder cap 46 to the cylinder member 24, and from the cylinder member 24 to the inner restraint segments 68 (as shear stress) of the shear flanges 66 of the shear ring 62. When the axial crash landing loads reach the predetermined axial load failure limit of the shear flanges 66, the shear flanges 66 fail in shear along the shear line 72 such that the cylinder member 24 is no longer restrained in static combination with the trunnion fitting 12. Continued upward displacement of the piston member 26 forces the cylinder member 24 to be displaced upwardly with respect to the trunnion fitting 12. The upward displacement of the cylinder member 24, which is controlled in part and facilitated by the interactive surface 57 of the cylindrical cutter member 52, causes the frangible tube member 58 to interact with the cylindrical cutter member 52, resulting in fracturing of the frangible tube member 58. The fracturing of the frangible tube member 58 that occurs due to the continued upward displacement of the cylinder member 24 results in a significant dissipation of the impact energy generated as a result of the crash landing (see example hereinbelow). As the cylinder member 24 strokes during the crash landing sequence, the energy dissipated by the progressive fracturing of the frangible tube member 58 is such that the axial load acting on the landing gear remains relatively constant at the predetermined axial load failure limit. Thus, the energy dissipating efficiency of the shock strut assembly 10 according to the present invention is relatively high. The configuration of the arcuate fracture surface 54 of the cylindrical cutter member 52 facilitates removal of the fractured pieces of the frangible tube member 58 to preclude interference with the continuation of the fracturing mechanism.

The embodiment of the shock strut assembly 10 described hereinabove is designed for use in the S-92™ HELIBUS™ helicopter being developed by Sikorsky Aircraft Corporation, a subsidiary of United Technologies Corporation (S-92 and HELIBUS are trademarks of Sikorsky Aircraft Corporation). The sizing and material composition of the shear ring 62 as described hereinabove are based upon the design criteria that: (1) the mechanical load control subassembly 60 have the capability to withstand approximately 120,000 landings (approximately 30,000 flight hours) without failure; and (2) the shear flanges 66 repeatably fail in shear at a predetermined axial load failure limit of about 32,000 lbs. This predetermined axial load failure limit allows the landing gear system, and in particular, the shock strut subassembly 10 described herein, of the S-92™ HELIBUS™ helicopter to accommodate a significant percentage of the crash landing energy that results from a 26 ft/sec sink rate (which is equivalent to a free fall crash landing from a height of about 10.5 feet). The ability to accommodate a 26 ft/sec sink rate is one of the safety design criteria of the S-92™ HELIBUS™ helicopter.

A 26 ft/sec sink rate is equivalent to dropping the S-92™ HELIBUS™ helicopter from a height of approximately 10.5 feet. Based upon a gross weight of approximately 24,000 lbs for the S-92™ HELIBUS™ helicopter, this results in the generation of about 3,023,106 in-lbs of energy. The S-92™ HELIBUS™ helicopter has a tricycle-type landing gear system consisting of two main landing gears and a nose landing gear. Full fracturing of the frangible tube member 58 of the shock strut assembly 10 of each of the main landing gears and the nose landing gear dissipates about 1,511,553 in-lbs of the energy generated in a crash landing under these circumstances (about 503,851 in-lbs of energy in the nose landing gear and about 503,851 in-lbs of energy in each of the main landing gears). Combining the energy dissipated by the frangible tube members 58 with the energy dissipated by the compression of the corresponding oleo strut subassemblies 14 and the energy dissipated by the destruction of the wheels 20 results in a total energy dissipation of about 2,267,330 in-lbs by the tricycle-type landing gear system. The total energy dissipated by the tricycle-type landing gear system represents approximately 75% of the energy generated during a crash landing of an S-92™ HELIBUS™ helicopter at a sink rate of 26 ft/sec (the energy dissipated by fracturing of the frangible tube members 58 accounts for about 50% of the energy dissipated).

A variety of modifications and variations of the present invention are possible in light of the above teachings. It is therefore to be understood that, within the scope of the appended claims, the present invention may be practiced otherwise than as specifically described hereinabove.

We claim:

1. A shock strut assembly for an aircraft landing gear, comprising:

a trunnion fitting mounted in combination with the aircraft;

a wheel subassembly;

a compressible oleo strut subassembly operative to attenuate energy coupled into the aircraft by said wheel subassembly during normal landings, said compressible oleo strut subassembly including a cylinder member having a lower end and an upper end mounted in combination with said trunnion fitting, and a piston member having a lower end affixed in combination with said wheel subassembly and an upper end slidably inserted in said lower end of said cylinder member;

a mechanical load control subassembly locked in combination with said upper end of said cylinder member and said trunnion fitting, said mechanical load control subassembly being operative during normal landings to restrain relative movement between said cylinder member and said trunnion fitting and being operative during a crash landing in response to a predetermined axial load to allow upward displacement of said cylinder member with respect to said trunnion fitting, said mechanical load control subassembly including a shear ring having a cylindrical body and opposed shear flanges extending outwardly from said cylindrical body, each said shear flange having a torsion key, a retainer nut, said upper endface of said cylinder member having complementary flange cutouts, and said trunnion fitting having an upper internal shoulder having complementary torsion key slots;

said shear ring being locked in combination with said upper end of said cylinder member and said trunnion fitting by threaded engagement of said retainer nut with said trunnion fitting wherein said retainer nut engages said shear flanges of said shear ring; and wherein in said locked combination said cylindrical body abuts said cylinder member, said shear flanges engage said complementary flange cutouts of said cylinder member, and said torsion keys are disposed in said complementary torsion key slots; and an energy dissipating subassembly disposed in combination with said cylinder member and operative in response to the crash landing to mechanically dissipate crash landing energy induced in the aircraft by said wheel subassembly during the upward displacement of said cylinder member.

2. The shock strut assembly of claim 1 wherein each said shear flange comprises an inner restraint segment and an outer shearable segment defined by a shear line such that in said locked combination said retainer nut engages said outer shearable segments of said opposed shear flanges and said inner restraint segments of said opposed shear flanges engage said complementary flange cutouts of said trunnion fitting.

3. The shock strut assembly of claim 2 wherein said opposed shear flanges have a predetermined thickness such that, in response to said predetermined axial load from the crash landing, said opposed flanges are sheared along said shear lines thereof wherein the upward displacement of said cylinder member with respect to said trunnion fitting can occur.

4. The shock strut assembly of claim 1 wherein said energy dissipating subassembly comprises:

a cylindrical cutter member secured in combination with said cylinder member and said trunnion fitting; and a frangible tube member mounted in concentric combination with said cylinder member, said frangible tube having a lower end secured in combination with said lower end of said cylinder member and an upper end disposed in abutting engagement with said cylindrical cutter member;

the upward displacement of said cylinder member during the crash landing causing said frangible tube member to interact with said cylindrical cutter member wherein said frangible tube member is fractured during the upward displacement of said cylinder member with respect to said trunnion member.

5. The shock strut assembly of claim 4 wherein said cylindrical cutter member includes an arcuate fracture surface, and wherein said upper end of said frangible member is disposed in abutting engagement with said arcuate fracture surface.

6. A shock strut assembly for an aircraft landing gear, comprising:

a trunnion fitting mounted in combination with the aircraft;

a wheel subassembly;

a compressible oleo strut subassembly operative to attenuate energy coupled into the aircraft by said wheel subassembly during normal landings, said compressible oleo strut subassembly including a cylinder member having a lower end and an upper end mounted in combination with said trunnion fitting, a piston member having a lower end affixed in combination with said wheel subassembly and an upper end slidably inserted in said lower end of said cylinder member, and a floating piston mounted for sliding movement in said piston member; a mechanical load control subassembly including a shear ring having a cylindrical body and opposed shear flanges extending outwardly from said cylindrical body, each said shear flange having a torsion key, a retainer nut, said upper endface of said cylinder member having complementary flange cutouts, and said trunnion fitting having an upper internal shoulder having complementary torsion key slots, said shear ring being locked in combination with said upper end of said cylinder member and said trunnion fitting by threaded engagement of said retainer nut with said trunnion fitting wherein said retainer nut engages said shear flanges of said shear ring, and wherein in said locked combination said cylindrical body abuts said cylinder member, said shear flanges engage said complementary flange cutouts of said cylinder member, and said torsion keys are disposed in said complementary torsion key slots;

said mechanical load control subassembly being operative during normal landings to restrain relative movement between said cylinder member and said trunnion fitting and being operative during a crash landing in response to a predetermined axial load to allow upward displacement of said cylinder member with respect to said trunnion fitting; and an energy dissipating subassembly including a cylindrical cutter member secured in combination with said cylinder member and said trunnion fitting, and a frangible tube member mounted in concentric combination with said cylinder member, said frangible tube member having a lower end secured in combination with said lower end of said cylinder member and an upper end disposed in abutting engagement with said cylinder member;

the upward displacement of said cylinder member during the crash landing causing said frangible tube member to interact with said cylindrical cutter member wherein said frangible tube member is fractured during the upward displacement of said cylinder member to mechanically dissipate crash landing energy induced in the aircraft by said wheel subassembly.

7. The shock strut assembly of claim 6 wherein each said shear flange comprises an inner restraint segment and an outer shearable segment defined by a shear line such that in said locked combination said retainer nut engages said outer shearable segments of said opposed flanges and said inner restraint segments of said opposed shear flanges engage said complementary flange cutouts of said cylinder member.

8. The shock strut assembly of claim 7 wherein said opposed shear flanges have a predetermined thickness such that, ill response to said predetermined axial load from the crash landing, said opposed flanges are sheared along said shear lines thereof wherein the upward displacement of said cylinder member with respect to said trunnion fitting can occur.

9. The shock strut assembly of claim 6 wherein said cylindrical cutter member includes an arcuate fracture surface, and wherein said upper end of said frangible member is disposed in abutting engagement with said arcuate fracture surface.

* * * * *